UNITED STATES PATENT OFFICE.

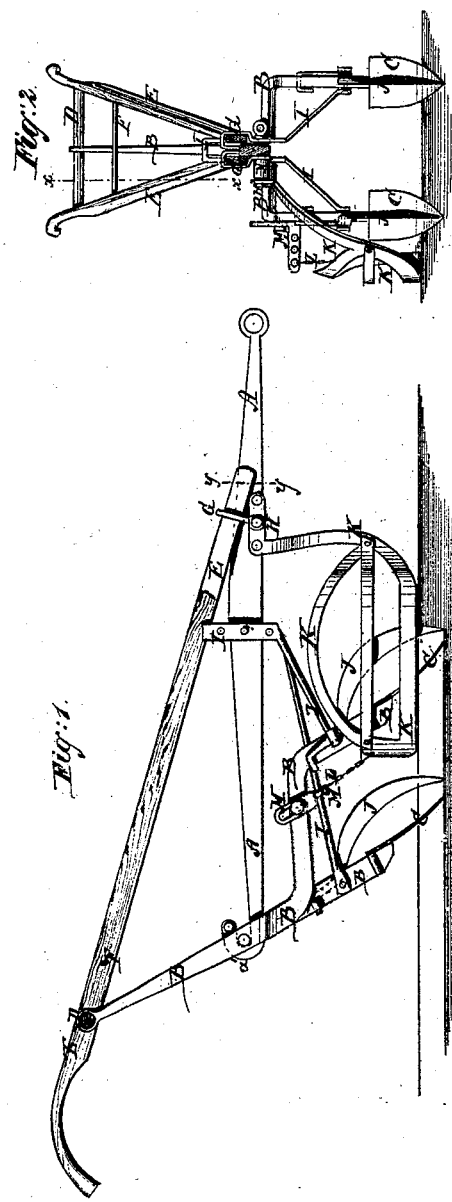

CH. IMMANUEL VOIGT, OF WEST SALEM, ILLINOIS.

IMPROVEMENT IN DOUBLE-SHOVEL PLOWS.

Specification forming part of Letters Patent No. 95,511, dated October 5, 1869.

*To all whom it may concern:*

Be it known that I, CHARLES IMMANUEL VOIGT, of West Salem, in the county of Edwards and State of Illinois, have invented a new and useful Improvement in Iron Double-Shovel Plows; and I do hereby declare that the following is a full, clear, and exact description thereof, which will enable those skilled in the art to make and use the same, reference being had to the accompanying drawings, forming part of this specification.

Figure 1 is a side view of my improved plow, partly in section, through the line $x\ x$, Fig. 2, to show the construction. Fig. 2 is a front view of the same, partly in section, through the line $y\ y$, Fig. 1, to show the construction.

Similar letters of reference indicate corresponding parts.

My invention has for its object to furnish an improved double-shovel iron plow or cultivator, which shall be simple in construction, easily adjusted, effective in operation, and easily operated; and it consists in the construction and combination of various parts of the plow, as hereinafter more fully described.

A is the plow-beam, which is made in the form of an iron bar set edgewise and tapering toward both ends from at or near its middle point.

Upon the forward end of the beam A is formed an eye to receive the double-tree clevis, and upon its rear end is formed a hook, $a'$, by means of which it is connected to the standard B.

B is the standard, the lower part of which is branched or forked, said branches being bent outward and downward, and one of them also forward, to bring their lower ends into proper position to receive the plows C. The plows C may be of any desired form or size, according to the requirements of the plowing to be done, and have two holes formed through them, the lower one to receive the hooks formed upon the lower ends of the standards B, and the other or upper hole to receive a bolt which passes through the lower part of said standards and firmly secures the plows in place. The upper parts of the standards B may be welded or bolted to each other. The latter is preferred, and is extended upward to form an upright, the upper end of which is secured to the round D, the ends of which work in the handles E. The handles E are connected to each other, either above or below the round D, by a long bolt or round, F. The forward ends of the handles E enter keepers or staples G, which are secured to the beam A by a bolt, H. The hook $a'$ of the rear end of the beam A enters a recess in the angle or fork of the standards B, and hooks around a pin or bolt passing through said standards, as shown in Fig. 1, the forward end of said hook $a'$ projecting in front of said standard B, and having a hole formed through it to receive a wooden pin. The draft-strain upon the standards B is sustained by the gage-rods I, the rear ends of which are secured to the outer or inner sides of the standards B by hook-headed bolts, and the forward ends of which are bent upward, flattened, have a series of holes formed through them, and are bolted to the plow-beam, so that by moving the said bolt from one to another of said holes the pitch of the plow may be adjusted, as described. If desired, the brace and gage rods I may be made in one piece and secured to the beam A by the same bolt, so that the two plows may always be held at the same distance apart.

J are the cutters, the blades of which are curved in about the form shown in Fig. 1, and the shanks of which are so formed as to hook upon the rear edge of the standards B, and rest against the hook-headed bolts by which the rear ends of the gage-rods I are secured to the said standards B, and are clamped to said standards by the hook-heads of the said bolts. This manner of attachment not only holds the cutters firmly, but at the same time allows them to be conveniently raised and lowered, as required. Cutters of this form, when they strike the covered cornstalks of the previous crop, either cut them off or slide over them, and thus prevent the small corn from being torn up.

K is the fender, which is formed of three bars bolted or riveted to each other at their forward and rear ends. The central bar is nearly horizontal, and the upper and lower bars are curved, as shown. The fender K is made somewhat concave upon its inner side, and its particular form must depend upon the construction of the plows with which it is connected. The forward end of the lower bar of the fender is extended upward and inward, and its upper end is bent forward and has a series of holes formed in it to receive the bolt H, by which it is connected to the plow-beam A. The bolt H is made long, and the additional space is taken up by one or more wooden blocks or washers, N, which may be placed upon the said bolt, upon the outside or inside of the fender-bar, according as it is desired to have said fender nearer to or farther from the plows. The bolt H should be provided with two nuts, one to secure the staples or keepers G in place and the other to secure the fender-bar and washers.

To the rear end of the fender K is attached a hook, L, and one or more links, which said hook hooks into one or the other of the series of holes formed in the projecting arm of the slide M, so that the rear end of the fender may be adjusted to correspond with the adjustment of its forward end by simply moving the hook L from one to another of said holes.

The upper arm or body of the slide M is slotted, and is secured to the horizontal part of the standard B by a bolt, as shown in Fig. 1, so that the said slide may be raised or lowered, or inverted to adjust the fender, as the circumstances of the case may require.

Having thus described my invention, what I claim as new, and desire to secure by Letters Patent, is—

1. The beam A, brace or gage rods I, standards B, round D, bolt or round F, handles E, keepers or staples G, and bolt H, in combination with each other, when said parts are constructed and arranged substantially as herein shown and described, and for the purposes set forth.

2. The cutters J, constructed and adjustably secured to the standards B, substantially as herein shown and described, and for the purposes set forth.

3. The fender K, constructed as described, and adjustably connected to the plow-beam A and standards B by means of the long bolt H, washers N, hook and links L, and adjustable slide M, substantially as herein shown and described, and for the purposes set forth.

CH. IMMANUEL VOIGT.

Witnesses:
   FRANCIS PIXLEY,
   PAUL HALLBECK.